US012663639B2

(12) United States Patent
Chen et al.

(10) Patent No.: US 12,663,639 B2
(45) Date of Patent: Jun. 23, 2026

(54) METHOD FOR METALENS, METALENS, SHAPING AND BEAM-COMBINATION DEVICE AND DISPLAY DEVICE

(71) Applicant: SHENZHEN METALENX TECHNOLOGY CO., LTD, Shenzhen (CN)

(72) Inventors: Jianfa Chen, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 201 days.

(21) Appl. No.: 18/795,149

(22) Filed: Aug. 5, 2024

(65) Prior Publication Data

US 2025/0060582 A1     Feb. 20, 2025

(30) Foreign Application Priority Data

Aug. 14, 2023    (CN) ......................... 202311022322.1

(51) Int. Cl.
 *G02B 27/00* (2006.01)
 *B82Y 20/00* (2011.01)
 (Continued)

(52) U.S. Cl.
 CPC .......... *G02B 27/0012* (2013.01); *B82Y 20/00* (2013.01); *G02B 1/002* (2013.01); *G02B 3/0056* (2013.01); *G02B 2207/101* (2013.01)

(58) Field of Classification Search
 CPC .. G02B 27/0012; G02B 1/002; G02B 3/0056; G02B 2207/101; G02B 5/1876; G02B 27/0961; G02B 27/1006; B82Y 20/00
 (Continued)

(56) References Cited

U.S. PATENT DOCUMENTS

2022/0099861 A1*  3/2022  Li ........................ G02B 5/3025
2022/0295023 A1*  9/2022  Sorg .................... G02B 27/143
 (Continued)

FOREIGN PATENT DOCUMENTS

CN        116169563        5/2023
CN        118151477        6/2024

*Primary Examiner* — William R Alexander
(74) *Attorney, Agent, or Firm* — JCIPRNET

(57) ABSTRACT

A design method for a metalens, a metalens, a shaping and beam-combination device and a display device are provided, when Gaussian beams passes through the metalens, the Gaussian beams are shaped into a plurality of flat-topped beams that project to a target position on a target plane. The method includes: determining an incident parameter, and the incident parameter includes wavelengths and radius of the plurality of Gaussian beams; determining an outgoing parameter, and the outgoing parameter includes a width of flat-topped beams; setting metalens portions on the metalens and determining a position of each metalens portion; the metalens portions and the Gaussian beams are one-to-one correspondence, calculating a modulation phase distribution according to the incident parameter, and the outgoing parameter and the position of each metalens portion; arranging unit cells on the metalens portions according to the modulation phase distribution, and obtaining the metalens.

20 Claims, 12 Drawing Sheets

(51) Int. Cl.
*G02B 1/00* (2006.01)
*G02B 3/00* (2006.01)

(58) Field of Classification Search
USPC ............................................. 359/642
See application file for complete search history.

(56) References Cited

U.S. PATENT DOCUMENTS

| | | | | |
|---|---|---|---|---|
| 2022/0357484 A1* | 11/2022 | Hu | .......................... | G02B 1/002 |
| 2023/0015748 A1* | 1/2023 | Smith | ................ | G02B 27/0905 |
| 2023/0018018 A1* | 1/2023 | Johnson | ................. | H04B 10/69 |
| 2023/0136630 A1* | 5/2023 | Cai | .................... | G02B 27/0927 |
| | | | | 606/18 |
| 2024/0289511 A1* | 8/2024 | Chen | ................. | G02B 27/0012 |
| 2025/0018503 A1* | 1/2025 | Boerkamp | ......... | B23K 26/0648 |
| 2025/0155604 A1* | 5/2025 | Zhou | ....................... | G02B 1/002 |
| 2025/0180898 A1* | 6/2025 | Xi | ...................... | G02B 27/0012 |
| 2025/0199299 A1* | 6/2025 | Cayer | .................... | G02B 27/48 |
| 2025/0355090 A1* | 11/2025 | Beatson | ................ | G01S 7/4816 |

* cited by examiner

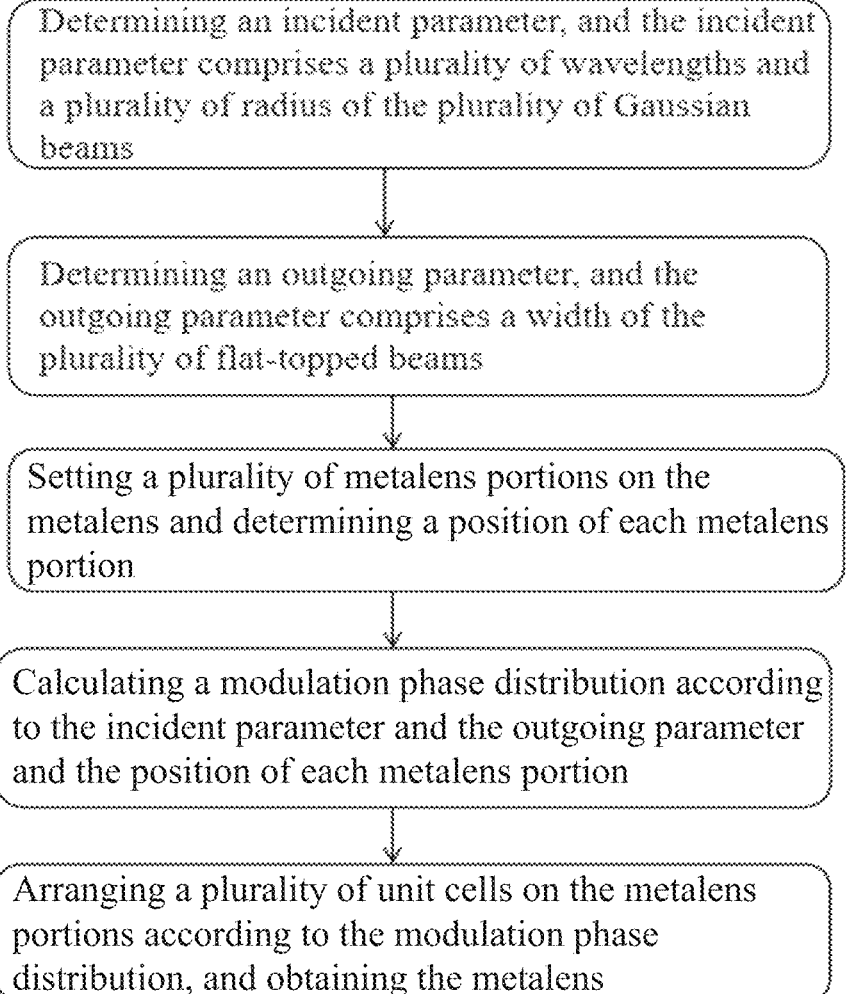

Determining an incident parameter, and the incident parameter comprises a plurality of wavelengths and a plurality of radius of the plurality of Gaussian beams Determining an outgoing parameter, and the outgoing parameter comprises a width of the plurality of flat-topped beams Setting a plurality of metalens portions on the metalens and determining a position of each metalens portion Calculating a modulation phase distribution according to the incident parameter and the outgoing parameter and the position of each metalens portion Arranging a plurality of unit cells on the metalens portions according to the modulation phase distribution, and obtaining the metalens

FIG. 1

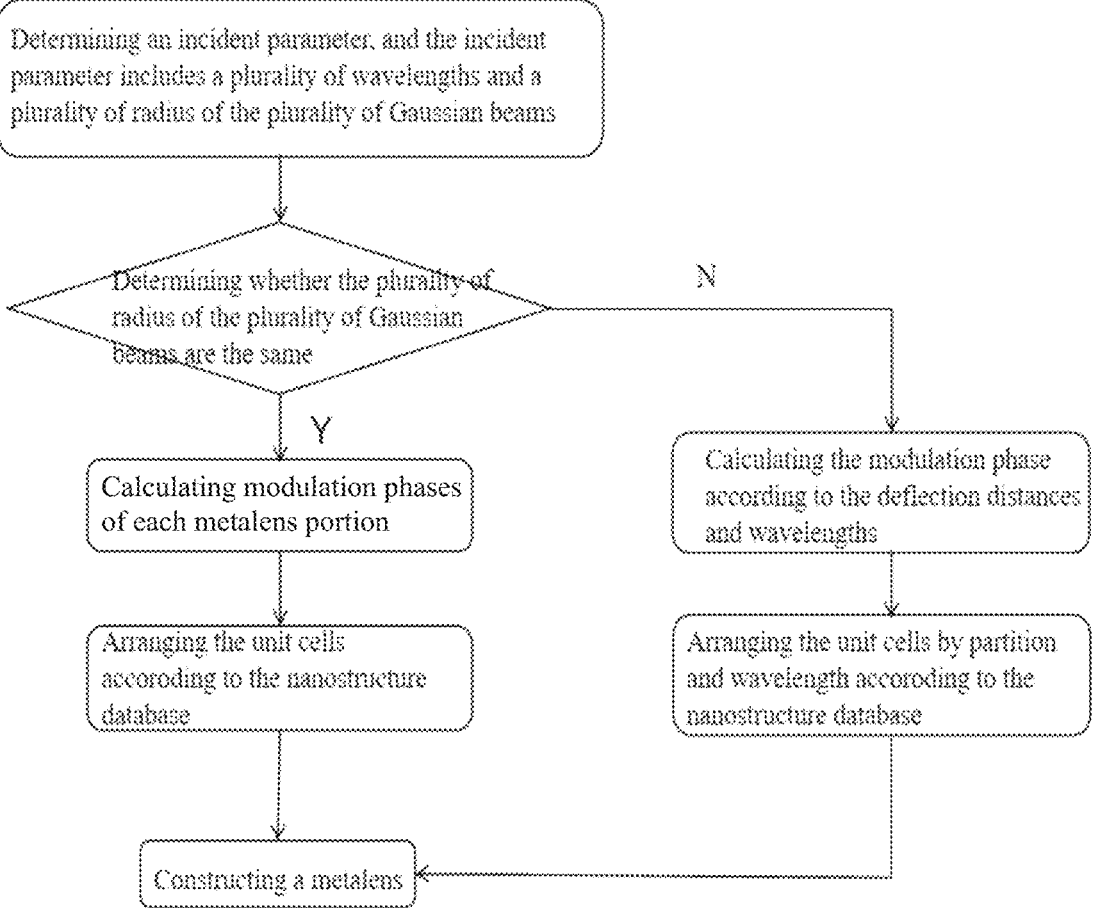

Determining an incident parameter, and the incident parameter includes a plurality of wavelengths and a plurality of radius of the plurality of Gaussian beams Determining whether the plurality of radius of the plurality of Gaussian beams are the same

N

Y

Calculating modulation phases of each metalens portion

Calculating the modulation phase according to the deflection distances and wavelengths Arranging the unit cells accoroding to the nanostructure database Arranging the unit cells by partition and wavelength accoroding to the nanostructure database Constructing a metalens

FIG. 2

METHOD FOR METALENS, METALENS, SHAPING AND BEAM-COMBINATION DEVICE AND DISPLAY DEVICE

CROSS-REFERENCE TO RELATED APPLICATION

This application claims the priority benefit of China application serial no. 202311022322.1, filed on Aug. 14, 2023. The entirety of the above-mentioned patent application is hereby incorporated by reference herein and made a part of this specification.

BACKGROUND

Technical Field

The present disclosure relates to the field of an optical technology, in particular to a design method for a metalens, a metalens, a shaping and beam-combination device and a display device.

Description of Related Art

In the field of laser processing or laser illumination, the output energy of a single laser may not be enough, so it is necessary to combine multiple beams to one beam, such as using multiple-order laser beam combination system.

Generally, the light beams outputted from the laser are Gaussian beams. For example, the laser beams outputted by the solid state laser, the gas laser or the fiber laser have a Gaussian intensity distribution in any cross-section at any position. If the above Gaussian-distributed laser beams are directly combined, the light intensity of the output laser beam will be unevenly distributed. And in the field of laser processing, the above combined laser beams may result in the roughness of the processed surfaces. And in the field of laser illumination, the above combined laser beams may result in the unevenness of the illumination spot.

In order to solve the above problems, the prior art tends to add a beam-shaping element at the output end of the laser beam combining system, which increases a larger optical length of the optical system and does not facilitate miniaturization of the whole system.

In addition, in the field of colorful projection, the RGB lasers are generally arranged tightly to display the colors, but the different RGB lasers can still be distinguished under close observation. The light intensity distribution of the RGB lasers still exhibits an uneven Gaussian distribution, which improves the display quality of the display screen.

SUMMARY

To solve the problem of uneven distribution of Gaussian beams and poor quality of the beam combination in the prior art, a design method for metalens is provided by the present disclosure in the first aspect, when a plurality of Gaussian beams passes through the metalens, the Gaussian beams are shaped into a plurality of flat-topped beams that project to a target position on a target plane, where the design method includes: determining an incident parameter, and the incident parameter comprises a plurality of wavelengths and a plurality of radius of the plurality of Gaussian beams; determining an outgoing parameter, and the outgoing parameter comprises a width of the plurality of flat-topped beams; setting a plurality of metalens portions on the metalens and determining a position of each metalens portion; the metalens portions and the plurality of Gaussian beams are one-to-one correspondence, calculating a modulation phase distribution according to the incident parameter, and the outgoing parameter and the position of each metalens portion; arranging a plurality of unit cells on the metalens portions according to the modulation phase distribution, and obtaining the metalens.

In the second aspect, a metalens is provided by the present disclosure, the metalens includes a plurality of metalens portions corresponding to the incident Gaussian beams, when the Gaussian beams pass through the metalens, the Gaussian beams are shaped into flat-topped beams and the flat-topped beams projects to the target position on the target plane.

The plurality of metalens portions include shaping-deflection portions, and the phase distribution of the shaping-deflection metalens portion is a combination of the phase distribution of the flat-topped beam on a deflection position in x-axis $\varphi_{1x}(x)$ and the phase distribution of the flat-topped beam on a deflection position in y-axis $\varphi_{1y}(y)$. The plurality of metalens portions include shaping-deflection portions and shaping metalens portions; the shaping-deflection metalens portion is configured with the shaping phase distribution $\varphi_1(x, y)$, and is used to modulate the Gaussian beams into flat-topped beams; the shaping-modulation portions has the deflection phase distribution $\varphi_2(x, y)$, and is used to defect the flat-topped beams to the target position.

The above scheme simultaneously homogenizes the light intensity and combines the incident multiple light beams by configuring the metalens portions, so as to form the light spots with good light intensity uniformity. Moreover, the metalens is a two-dimensional planar lens for light modulation by the sub-wavelength nanostructures, which can reduce the sharp increase of the optical length caused by the additional optical elements in the prior art as much as possible.

Optionally, the working wavelengths of multiple metalens portions are different for receiving Gaussian beams with different wavelengths. Specifically, the metalens portions may include unit cells with phases covering from 0 to $2\pi$ in working wavelength.

In above design scheme based on the multiple wavelengths, the phase modulation for different wavelengths can be operated, which is especially suitable for the modulation of different wavelengths beams in RGB color projection. The present disclosure can form light spots with good color mixing effects and solve the technical problem of poor display quality of the display screen in the field of color projection in the prior art.

In another optional scheme, the working wavelengths of the metalens portions are the same, and the phase distribution is correlated with the working wavelength.

Optionally, the unit cells may be set on different positions of the same side of the surface of the substrate. During the processing, all the unit cells in metalens portions are arranged on one photolithography mask. And in the actual manufacturing process, all the unit cells in metalens portions will be processed on one metalens. In the process of using, each beam can be aligned with the corresponding metalens portion. The advantage of the above design of metalens portions over multi-metalens splicing is that it avoids the splicing tolerance. Comparing with splicing multiple metalens into one metalens, the metalens provided by the present disclosure can be directly obtained to combine beams with different wavelengths.

In the third aspect, a beam-combination device is provided by the present disclosure, the device includes the metalens and the inputting end, the inputting end is setting on the downstream of the optical path of the metalens and is used to input the plurality of Gaussian beams, the plurality of metalens portions align with one of the Gaussian beams emitted by the inputting end, respectively.

The beam combination device provided by the present disclosure can be applied to the field of laser processing or laser illumination, which has a smaller optical length and smaller size and thus can solve the problem of uneven light intensity of the combined beam as outputting from the output end.

In the fourth aspect, a display device is provided, and the device includes the metalens of claim 13, the inputting end and an outputting end. The inputting end is used to inputting the plurality of monochromatic Gaussian beams of different colors, the metalens is used for mixing the plurality of monochromatic Gaussian beams of different colors and forming a pre-set color flat-topped beam, and then outputting the pre-set color flat-topped beam from the outputting end. The plurality of metalens portions in metalens are used to perform the beam expansion for the flat-topped beams.

The plurality of metalens portions are used to collimate or expand the flat-topped beams. If the metalens portions are used to expand the flat-topped beams, the RGB beams can be formed into a spot for the colorful display or projection. And the size of the spot is close to the sum of the three RGB spots.

The above schemes apply the metalens to the colorful RGB projection, to form spots with better light intensity uniformity and color mixing effect and obtain a better color rendering index of display or projection.

To sum up, the above technical schemes in the present disclosure design a metalens by the design of metalens portions (optionally portion design of wavelengths) to form a metalens array composed of a plurality of metalens portions, which can modulate multiple wavelengths simultaneously. And it also will extend to the modulation of multi-wavelength beams.

When the plurality of beams passes through the metalens, the metalens can realize shaping and beam combination simultaneously, and form the light spots with larger energy and uniform or good color rendering index. And the metalens is a two-dimensional planar lens for light modulation by using the sub-wavelength nanostructures. The metalens has a small volume and light weight, which solves the problem of the larger volume of the conventional lens group. In addition, due to the metasurface is processed by the semiconductor industry, the materials of the metalens are mainly heat-resistant materials such as silicon, and the phase variation of the metalens with temperature is very small. And the metalens can keep a better performance when facing Gaussian beams, and can withstand the larger power of the incident beams.

BRIEF DESCRIPTION OF THE DRAWINGS

The present disclosure may be better understood by reference to the description given below in combination with the drawings, where the same or similar drawing markings are used in all the drawings to represent the same or similar assemblies. The drawings are included in the specification along with the following detailed description and form part of the specification, and to further illustrate the preferred embodiments of the disclosure and explain the principles and advantages of the disclosure.

FIG. 1 shows a flow chart of a design method for a metalens provided by the embodiment of the present disclosure.

FIG. 2 shows a flow chart of a design method provided by the embodiment of the present disclosure.

DESCRIPTION OF THE EMBODIMENTS

Figure 3:
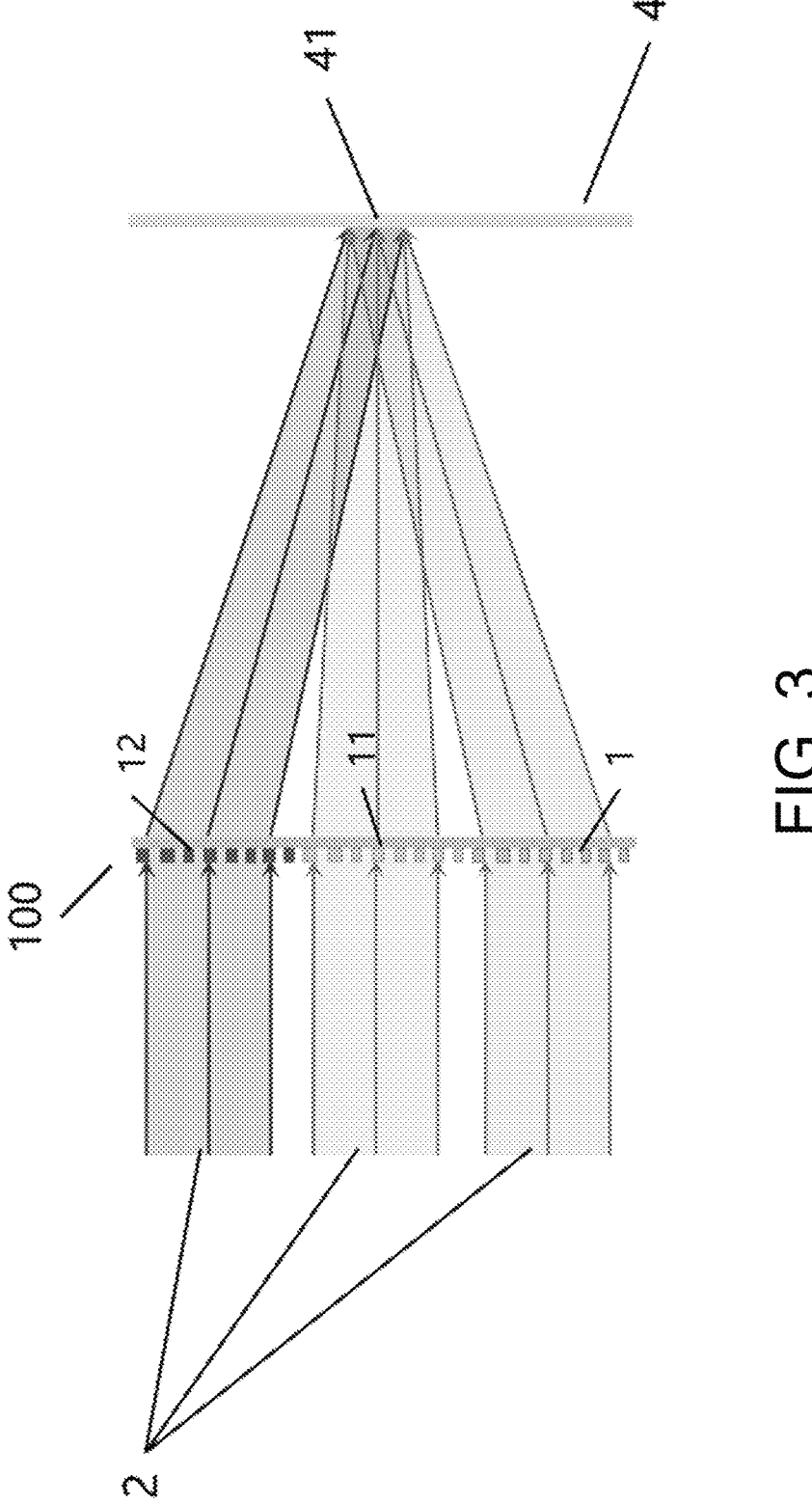
FIG. 3 shows an optical path diagram of the metalens provided by the embodiment of the present disclosure when working.

The present disclosure is described more comprehensively with reference to the drawings, and embodiments are shown in the drawings. However, the present disclosure may be implemented in many different ways, and should not be interpreted as limited to the embodiment described herein. Instead, these embodiments are provided such that the disclosure will be exhaustive and complete, and will fully convey the scope of the disclosure to those skilled in the art. The same attached drawing marks throughout indicate the same components. Furthermore, in the drawings, the thickness, ratio and size of the components are enlarged to clearly illustrate.

The term used herein is used only for the purpose of describing the specific embodiment and is not intended to be a limitation. The "a", "an", "this" and "one" do not represent a limit on the quantity in the disclosure. It is intended to include both singular and plural. For example, "one part" has the same meaning as "at least one part" unless the context clearly indicates otherwise. "At least one" should not be interpreted as limiting to the quantity "one". "Or" means "and/or". The term "and/or" includes any and all combinations of one or more of the associated listed items.

Unless the disclosure is limited, all terms used herein, including technical and scientific terms, have the same meaning as commonly understood by those skilled in the field. The terms defined in a jointly used dictionary shall be construed to have the same meaning as those in the relevant technical context and are not interpreted in an idealized or overly formal meaning unless expressly defined in the specification.

The meaning of "include" or "contain" specifies the nature, quantity, step, operation, parts, parts, or combinations thereof, but does not exclude other nature, quantity, step, operation, parts, or a combination of them.

This disclosure describes the implementation with reference to the section diagram as an idealized embodiment. Thus, relative to illustrated shape changes as a result of, for example, manufacturing technique and/or tolerance. Therefore, the embodiments described herein should not be interpreted to be limited to specific shapes of the region as shown herein, but should include deviations from shapes due to laser processing. For example, regions shown or described as flat may typically have coarse and/or non-linear characteristics. Also, the sharp angles shown can be rounded. Thus, the regions shown in the drawings are schematic in nature and their shapes are not intended to show the precise shape of the area and are not intended to limit the scope of the claim.

In view of the various problems in the prior art, the technical idea of the present embodiment is to design a portion of metalens (optionally portion design of wavelengths) to achieve the homogenization of the light intensity and beams combination of the incident multiple beams. In the multi-wavelength design, the phase modulation and nanostructure design of different wavelengths can be carried out to make it suitable for the modulation of different wavelength beams in RGB color projection, which can form light spots with light intensity uniformity and good color mixing effect. And the metalens is a two-dimensional planar lens for light modulation by the sub-wavelength metalens portion. The metalens has a small volume and light weight, which solves the problem of the large volume of the conventional lens group.

Embodiments according to the present disclosure will be described below with reference to the accompanying drawings.

A design method for a metalens is provided, when a plurality of Gaussian beams passes through the metalens, the Gaussian beams are shaped into flat-topped beams that project to a target position on a target plane. The method includes:

S1: determining an incident parameter, and the incident parameter includes a plurality of wavelengths and radius of the plurality of Gaussian beams; determining an outgoing parameter, and the outgoing parameter includes a width of the plurality of flat-topped beams.

The metalens 100 in embodiment of the present disclosure performs shaping and beam combination to the incident beams. The metalens 100 includes a plurality of metalens portions 1, and each metalens portion aligns with a beam in the plurality of beams and modulates the beams precisely to output the flat-topped beams as shown in FIG. 3. To achieve the purpose, the incident parameter and the outgoing parameter of the incident light need to be determined. Specifically, it is necessary to determine the wavelength and radius of the incident Gaussian beam, and the width of the outgoing flat-top beam. The wavelength of each Gaussian beam and the radius of each Gaussian beam should be determined. The radius of the plurality of Gaussian beams is the radius of the light intensity distribution on the plane where the metalens is located, and the metalens plane is the plane in which Gaussian beams transmits to the plane where the metalens is located (which is the radius at $1/e^2$ of the maximum light intensity).

Optionally, in this step, whether the wavelength of the incident multiple Gaussian beams is the same may be further determined.

The optical response of the unit cell is correlated with the wavelength of the incident light, so that the phase modulation of the metalens 100 varies with the wavelength of the incident light. When the wavelengths of the incident beams are different, the modulation phase of the metalens 100 may be designed for different wavelengths and the appropriate unit cells may be arranged according to different wavelengths.

Optionally, in this step, the radius in the direction of x-axis and the y-axis of each Gaussian beam, and the width in the direction of x-axis and the y-axis of the flat-top beam are determined. Preferably, the direction of x-axis and the y-axis are orthogonal. Further, the next step is determining whether the radius of the Gaussian beam is the same as the orthogonal direction and whether the width of the flat-top beam is the same as the orthogonal direction.

The method also includes: S2. setting a plurality of metalens portions on the metalens and determining a position of each metalens portion, and the metalens portions and the plurality of Gaussian beams are one-to-one correspondence.

A metalens 100 is divide into many metalens portions, and each metalens portion corresponds to one of the multiple Gaussian beams 2. It should be noted that the division refers to a conceptual functional portion, rather than a segmentation or cutting in the physical meanings. During the processing, the unit cells in all the metalens portions are arranged on one photolithography mask. And in the actual manufacturing process, the unit cells in metalens portions will be processed on one metalens. The advantage of the above design of metalens portion over multi-metalens splicing is that it avoids the splicing tolerance. Comparing with splicing multiple metalens into one metalens, the metalens provided by the present disclosure can be directly obtained to combine beams with different wavelengths.

Optionally, the relative position of each metalens portion 1 relative to the target position is determined in this step.

Optionally, in this step, the deflection distance between each metalens portion 1 and the corresponding target position, or the deflection distance of each metalens portion 1 relative to the target position 41 is determined.

The method also includes: S3. calculating a modulation phase distribution according to the incident parameter, and the outgoing parameter and the position of each metalens portion.

In one embodiment, based on whether the wavelength of the incident beam is same, the modulation phase distribution of each metalens portion 1 may be calculated by different methods, as shown in FIG. 2.

When the wavelengths of each incident beams are same, only one wavelength parameter should be considered as calculating the modulation phase distribution. Specifically, the deflection distance between each metalens portion 1 and the target position 41 is determined, and the modulation phase distribution of each metalens portion 1 is calculated based on the deflection distance. In other words, the shaping phase of each metalens portion 1 is calculated by the deflection distance of the beams.

When the wavelengths of each incident beams are different, the working wavelength of each metalens portion may be strictly limited. The working wavelength of each metalens portion needs to be considered when calculating the modulation phase distribution. Specifically, determining the deflection distance between each metalens portion and the corresponding target position, calculating the modulation phase distribution of the metalens portion 1 based on the deflection distance, and selecting the size of the unit cell in the metalens portion 1 and/or the wavelength of the Gaussian beam.

The method also includes: S4. arranging a plurality of metalens portions according to the modulation phase distribution and obtaining the metalens.

In one embodiment, the nanostructures may be arranged by different methods based on whether the wavelength of the incident beam is the same as shown in FIG. 2.

When the wavelength of each incident beam is the same, only one optical response of the unit cell under one wavelength excitation should be considered, that is, only one optical phase of the unit cell needs to be considered. At this time, in the database, the size of the unit cell corresponds the phase of the unit cell one-to-one, and the unit cells can be arranged according to the modulation phase distribution obtained by S3.

When the wavelength of each incident beam is different, the working wavelengths should be considered as arranging the unit cells. When searching the nanostructure database, all the size of the nanostructure corresponding to all incident beam wavelengths are searched to select the nanostructures with the phase covering from 0 to $2\pi$ at any working wavelength. After that, the unit cells are arranged according to the phase distribution of the metalens portions and the relationship between the size and the phase at each wavelength.

And there are many options for calculating the modulation phase distribution for each metalens portion 1. The two methods are presented schematically below.

Method 1: The modulation phase of each metalens portion is calculated by the shaping phase $\varphi_1$ and defection phase $\varphi_2$, and different metalens portions have different deflection phase $\varphi_2$ The shaping phase $\varphi_1$ is a collimation phase when the incident beams pass through the metalens and focus on one point.

When the metalens doesn't perform the deflection modulation, the metalens 100 only performs a forward shaping modulation along the optical path. At this moment, the shaping phase distribution in the coaxial direction (forward) through which the shaping phase distribution of the Gaussian beam 2 can be modulated as a flat-topped beam 3, which means the metalens only collimate the incident beams.

Figure 4:
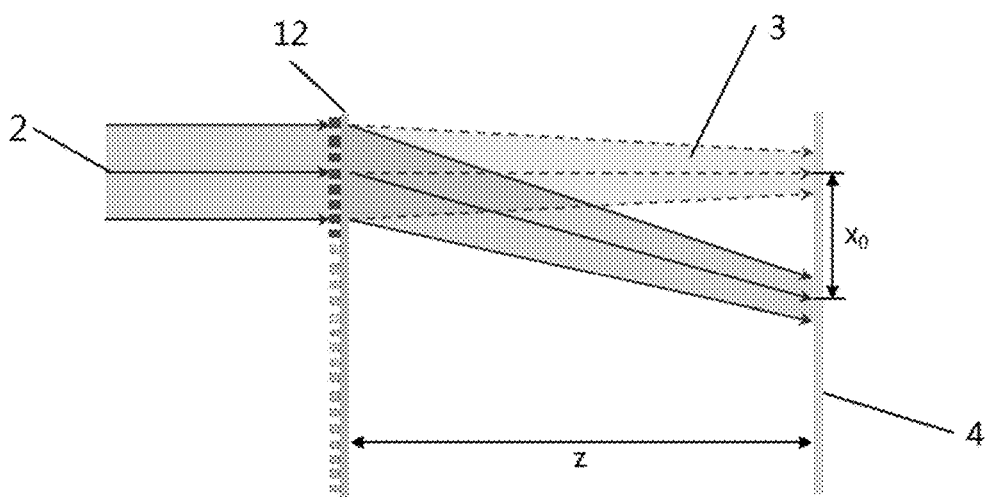
FIG. 4 provides an embodiment of a step in the design method of the present disclosure, in which the forward modulation is made and then the deflection phase is added.

The incident beams are transmitted along coaxial direction to the front after passing through the metalens, which is represented by the dotted line in FIG. 4. The deflection outgoing beam is shown in the solid line in FIG. 4, the transverse deflection distance of the beam center in FIG. 4 is $x_0$, and the deflection phase distribution $\varphi_2(x, y)$ of each metalens portion 1 is calculated according to the deflection distance.

The modulation phase distribution of the metalens portion satisfies: $\varphi(x, y) = \varphi_1(x, y) + \varphi_2(x, y)$.

Optionally, the shaping phase distribution $\varphi_1(x, y)$ satisfies:

$$\varphi_1(x, y) = \varphi_{1x}(x) + \varphi_{1y}(y)$$

$\varphi_{1x}(x)$ is the phase distribution of the flat-topped beam on the deflection position in x-axis; $\varphi_{1y}(y)$ is the phase distribution of the flat-topped beam on the deflection position in y-axis;

$$\varphi_{1x}(x) = \frac{2\pi}{\lambda}\left\{\frac{\omega_{1x}\omega_{2x}}{\sqrt{2\pi}}\left[\exp\left(-\frac{2x^2}{\omega_{1x}^2}\right) + x\int_0^x \exp\left(-\frac{2t^2}{\omega_{1x}^2}\right)dt - 1\right] - \frac{1}{2}x^2\right\}$$

$$\varphi_{1y}(y) = \frac{2\pi}{\lambda}\left\{\frac{\omega_{1y}\omega_{2y}}{\sqrt{2\pi}}\left[\exp\left(-\frac{2y^2}{\omega_{1y}^2}\right) + y\int_0^y \exp\left(-\frac{2t^2}{\omega_{1y}^2}\right)dt - 1\right] - \frac{1}{2}y^2\right\}$$

$\omega_{1x}$ is the radius of the Gaussian beam in the x-axis; $\omega_{1y}$ is the radius of the Gaussian beam in the y-axis; $\omega_{2y}$ is the half radius of the Gaussian beam in the y-axis; x, y are the plane coordinates of the shaping metalens portion; t is the integration variable; x0 is the deflection distance in x-axis; y0 is the deflection distance in y-axis; z is the distance between the metalens plane and the target plane; $\lambda$ is working wavelength.

In the above-mentioned formula, $\omega_{1x}$ may be not equal to $\omega_{1y}$, the radius of the incident Gaussian beam in the direction of the x-axis and y-axis are different. $\omega_{2x}$ may be not equal to $\omega_{2y}$, the width of the outgoing flat-topped beam in the direction of the x-axis and y-axis are different. $\omega_{1x}$ may be equal to $\omega_{1y}$, the radius of the incident Gaussian beam in the direction of the x-axis and y-axis are the same. $\omega_{2x}$ may be equal to $\omega_{2y}$, the width of the outgoing flat-topped beam in the direction of the x-axis and y-axis are the same.

When the radius of the incident Gaussian beams in the direction of the x-axis and y-axis are the same and the radius of the incident Gaussian beam in the direction of x-axis and y-axis are the same, the shaping phase satisfies:

$$\varphi(x, y) = \varphi_{1x}(x) + \varphi_{1y}(y);$$

$$\varphi_{1x}(x) =$$

$$\frac{2\pi}{\lambda * z}\left\{\frac{\omega_{1x}\omega_{2x}}{\sqrt{2\pi}}\left[\exp\left(-\frac{2(x-x_0)^2}{\omega_{1x}^2}\right) + (x-x_0)\int_0^{x-x_0}\exp\left(-\frac{2t^2}{\omega_{1x}^2}\right)dt - 1\right] - \frac{1}{2}(x-x_0)^2\right\};$$

$$\varphi_{1y}(y) =$$

$$\frac{2\pi}{\lambda * z}\left\{\frac{\omega_{1y}\omega_{2y}}{\sqrt{2\pi}}\left[\exp\left(-\frac{2(y-y_0)^2}{\omega_{1y}^2}\right) + (y-y_0)\int_0^{x-x_0}\exp\left(-\frac{2t^2}{\omega_{1x}^2}\right)dt - 1\right] - \frac{1}{2}(y-y_0)^2\right\};$$

where $\omega_1$ is the radius of the Gaussian beam; $\omega_2$ is the half radius of the Gaussian beam; x, y are the plane coordinates of the shaping metalens portion; t is the integration variable.

In FIG. 4, the beam only has a horizontally deflection, and the deflection phase is only related to x, and the deflection phase distribution is $\varphi_2(x)$. The deflection phase $\varphi_2(x)$ satisfies the following relationship:

$$\varphi_2(x) = \frac{2\pi}{\lambda}\frac{x_0}{\sqrt{x_0^2 + z^2}}x + \varphi_0$$

9

Where $\varphi_0$ is the constant of integration, during the modulation of the beam, the constant of integration will not influence the light intensity distribution, so the $\varphi_0$ can be ignored generally. Thus, the modulation phase distribution of each metalens portion 1 is:

$$\varphi(x, y) = \varphi_1(x, y) + \varphi_2(x)$$

For different metalens portions, the deflection distances $x_0$ of the different metalens portions are different, the deflection phase $\varphi_2$ can be calculated by inputting the corresponding deflection distance $x_0$. The shaping beams are projected to the same position to combine beams. It should be understood that the above embodiment is a transversal deflection embodiment, thus $\varphi_2$ is only relative to x. If the direction of the deflection is changed, the deflection phase may be described based on the deflection direction. For example, if the deflection direction has a component with the direction of the x-axis and y-axis, the deflection phase distribution is $\varphi_2(x, y)$, and $\varphi_2(x, y)$ satisfies:

$$\varphi_2(x, y) = \varphi_2(x) + \varphi_2(y);$$

$$\varphi_2(x) = \frac{2\pi}{\lambda} \frac{x_0}{\sqrt{x_0^2 + z^2}} x + \varphi_0;$$

$$\varphi_2(y) = \frac{2\pi}{\lambda} \frac{y_0}{\sqrt{y_0^2 + z^2}} y + \varphi_0;$$

where, the $\varphi_2(x)$ is deflection phase to the x-axis; $\varphi_2(x)$ is deflection phase to the y-axis; $\varphi_0$ is the constant of integration; $x_0$ is the deflection distance in x-axis; $y_0$ is the deflection distance in y-axis; z is the distance between the metalens plane and the target plane; $\lambda$ is the working wavelength.

Finally, the phase distribution of the metalens 100 may be split by metalens portions.

Method 2: the defection and shaping of the metalens will be considered simultaneously.

Figure 5:
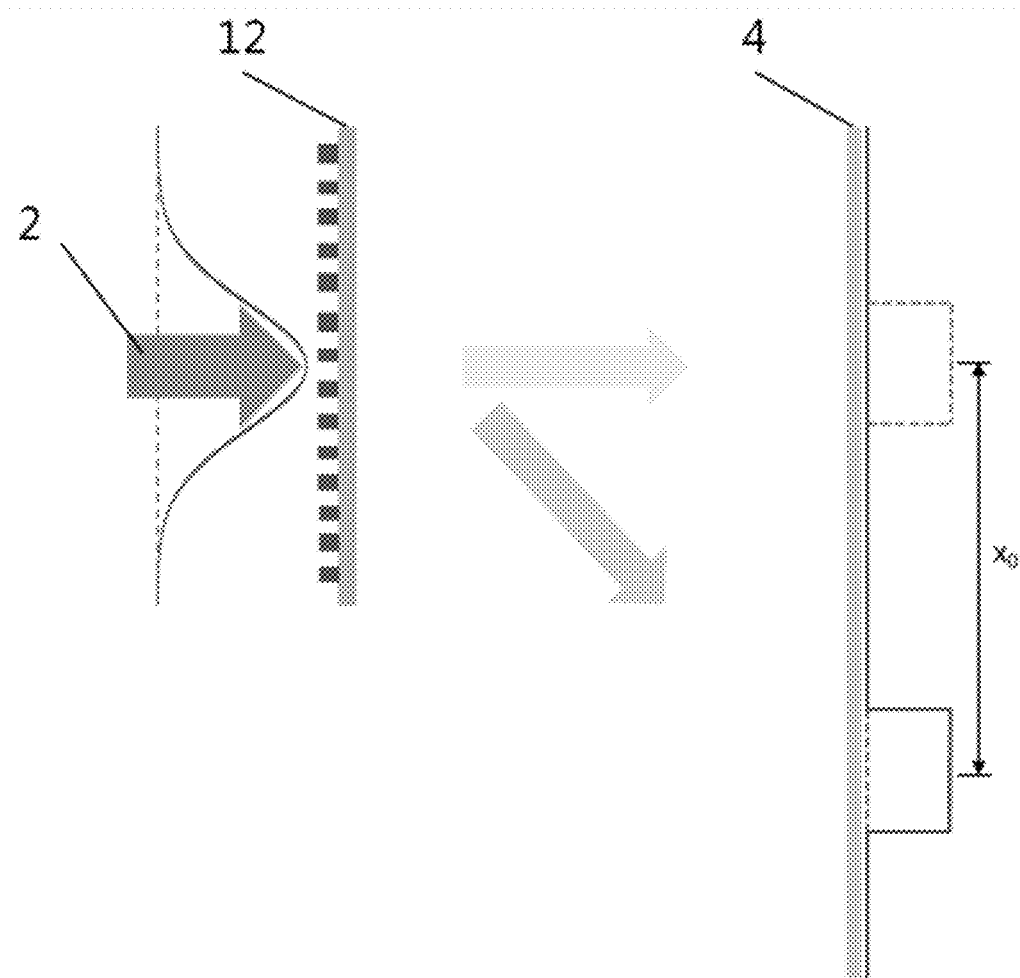
FIG. 5 provides an embodiment of a step in the design method of the present disclosure, in which a position deflection is considered during the modulation.

Each metalens portion is designed separately to modulate the beams and deflect to the same spatial position (that is target position 41). The deflection distance $x_0$ between the center of the flat-topped beam and the center of the incident Gaussian beam is shown in FIG. 5 after modulating by the metalens portions.

In terms of function, beam shaping is phase modulation to the light field, which can be calculated by using the G-S (Gerchberg-Saxton) algorithm or the iterative Fourier transform algorithm, or other phase-recovery algorithm. Meanwhile, due to the difference between the deflection of each metalens portion, the phase of each metalens portion may be calculated, respectively. The light intensity distributions of flat-topped beams with different targets are appropriately deflected, and the beams will be outgoing to the same spatial position after shaping of multiple-beams.

Figure 6:
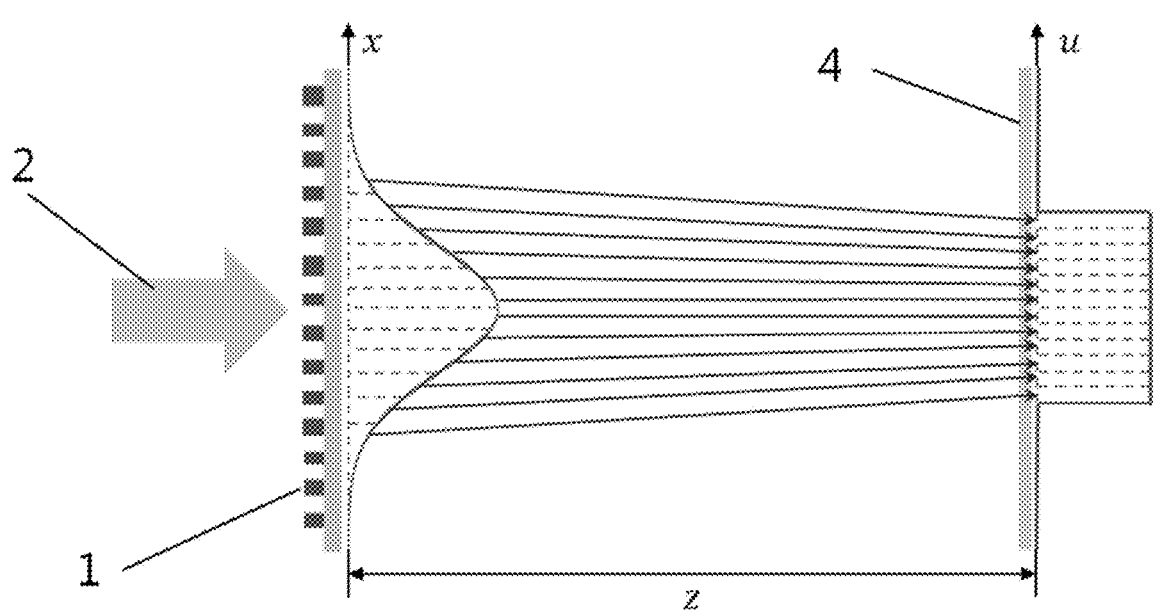
FIG. 6 shows a schematic diagram of the energy redistribution of the beam shaping according to the embodiment of the present disclosure.

In the working principle, the beam shaping is the redistribution of the beam energy, and the shaping phase can be calculated by using an analytical formula for the energy redistribution. FIG. 6 shows the redistribution of the beam energy as a schematic diagram of one-dimension: the energy of each metalens portion of the incident beam is assigned to the defined unit in the diffraction plane. The above procedure can be represented by the following formula:

10

$$\int_0^x I_i(t)dt = \int_0^{u(x)} I_t(t)dt$$

$I_i(x)$ is the light intensity distribution of the incident beams; $I_t(u)$ is the light intensity distribution that projects to the diffraction plane after shaping by the metalens 100, namely the light intensity distribution of the target beam. $u(x)$ represents the conversion relationship between the position of the light intensity distribution of the outgoing beam u and the intensity distribution position of the incident beam x. The Gaussian beam intensity distribution $$I_i(x) = \exp\left(-\frac{2x^2}{\omega_1^2}\right)$$

is inputted into the above equation and normalize:

$$u(x) = \frac{\omega_1 \omega_2}{\sqrt{2\pi}} \int_0^x \exp\left(-\frac{2t^2}{\omega_1^2}\right)dt$$

$\omega_1$ is the radius of the Gaussian beam (at the $1/e^2$ of the light intensity), $\omega_2$ is a half of the width of the flat-topped beam.

During the above energy conversion process, for the plane that has a distance of z from the metalens 100, the deflection angle $\theta$ of each cell light satisfies the following relationship:

$$\tan\theta = \frac{u(x) - x}{z}$$

One dimensional plastic phase satisfies the following relationship:

$$\sin\theta = \frac{\lambda}{2\pi} \frac{d\varphi_{1x}(x)}{dx}$$

And the metalens 100 generally involves a smaller angle, so $\tan\theta \approx \sin\theta$ $$\varphi_{1x}(x) = \frac{2\pi}{\lambda * z} \int_0^x [u(t) - t]dt$$

The final obtained phase distribution is:

$$\varphi_{1x}(x) = \frac{2\pi}{\lambda * z}\left\{\frac{\omega_1 \omega_2}{\sqrt{2\pi}}\left[\exp\left(-\frac{2x^2}{\omega_1^2}\right) + x\int_0^x \exp\left(-\frac{2t^2}{\omega_1^2}\right)dt - 1\right] - \frac{1}{2}x^2\right\}$$

The metalens portion with the deflection distance $x_0$ is shown in FIG. 5 as an example. The center of the flat-topped beam is the origin of coordinate, and the Gaussian beam intensity distribution is $$I_i(x) = \exp\left[-\frac{2(x - x_0)^2}{\omega_1^2}\right]$$

(that is the Gaussian beam intensity distribution has an upwards deflection distance $x_0$). The deflection distance $x_0$ is also considered when calculating the shaping phase, and the final obtained phase distribution is $$\varphi_{1x}(x) =$$

$$\frac{2\pi}{\lambda * z}\left[\exp\left(-\frac{2(x-x_0)^2}{\omega_1^2}\right) + (x-x_0)\int_0^{x-x_0}\exp\left(-\frac{2t^2}{\omega_1^2}\right)dt - 1\right] - \frac{1}{2}(x-x_0)^2\right\}$$

In the above formula, $\varphi_{1x}(x)$ is only in the case of one-dimensional curve shaping. But the metalens is a 2-dimensional planar devices, the above formula needs to be properly modified to apply to the two-dimensional situation, which is modulated in two directions, with the shaping phase distribution $\varphi_1(x, y)$ is:

$$\varphi_1(x, y) = \varphi_{1x}(x) + \varphi_{1y}(y)$$

$\varphi_{1x}(x)$ is the phase distribution of the flat-topped beam in the direction of x-axis, $\varphi_{1y}(y)$ is the phase distribution of the flat-topped beam in the direction of y-axis.

$$\varphi_{1x}(x) =$$

$$\frac{2\pi}{\lambda * z}\left\{\frac{\omega_{1x}\omega_{2x}}{\sqrt{2\pi}}\left[\exp\left(-\frac{2(x-x_0)^2}{\omega_{1x}^2}\right) + (x-x_0)\int_0^{x-x_0}\exp\left(-\frac{2t^2}{\omega_{1x}^2}\right)dt - 1\right] - \frac{1}{2}(x-x_0)^2\right\}$$

$$\varphi_{1y}(y) = \frac{2\pi}{\lambda * z}\left\{\frac{\omega_{1y}\omega_{2y}}{\sqrt{2\pi}}\left[\exp\left(-\frac{2(y-y_0)^2}{\omega_{1y}^2}\right) + (y-y_0)\int_0^{y-y_0}\exp\left(-\frac{2t^2}{\omega_{1y}^2}\right)dt - 1\right] - \frac{1}{2}(y-y_0)^2\right\}$$

$\varphi_{1x}(x)$ is the phase distribution of the flat-topped beam on the deflection position in x-axis; $\varphi_{1y}(y)$ is the phase distribution of the flat-topped beam on the deflection position in y-axis; $\omega_{1x}$ is the radius of the Gaussian beam in the x-axis; $\omega_{1y}$ is the radius of the Gaussian beam in the y-axis; $\omega_{2y}$ is the half radius of the Gaussian beam in the y-axis; x, y are the plane coordinates of the shaping metalens portion; t is the integration variable; $x_0$ is the deflection distance in x-axis; $y_0$ is the deflection distance in y-axis; z is the distance between the metalens plane and the target plane 4; $\lambda$ is working wavelength. The parameters represented by z and $x_0$ can be visually seen in FIG. 4.

Different metalens portions have different deflection distance $x_0$. And the different metalens portion corresponds to different deflection distances one to one. However, it should be noted that the size of the metalens portion should cover the incident beam as much as possible. Preferably, the size of each metalens portion is 1.5 times the size of the spot radius.

Figure 7:
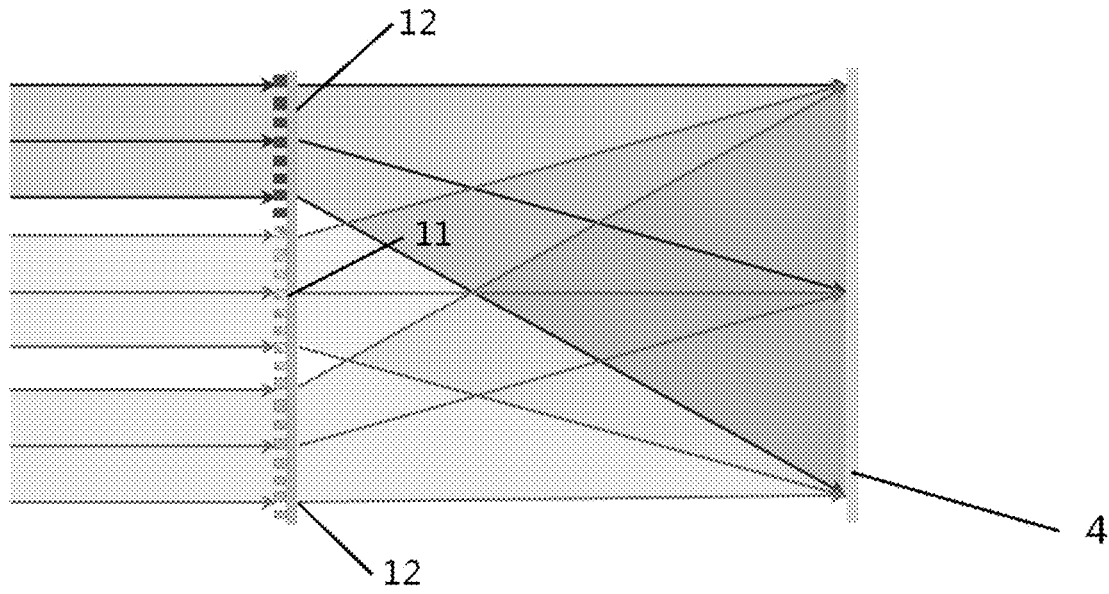
FIG. 7 is a colorful display schematic diagram of the display device related to the embodiment of the present disclosure.

It should be noted that the above schematic diagram of the beams are generally shown as compressed beams, which is generally used for transmitting the compressed beams. The device for laser processing is directly placed on the target plane or the rear target plane accesses to the optical element, or is connected to the fiber with a smaller size of the end face. In fact, the metalens 100 is not limited to compression, but the function of expansion may also be realized. As shown in FIG. 7, a schematic diagram of the metalens 100 forming the RGB beams into a spot, the size of the spot is close to the sum of sizes of the RGB spots for color display (projection).

The design method in the embodiment further includes: calculating the modulation phase distribution the metalens portion arranged with the wavelength. Specifically, in the calculation of the modulation phase of each metalens portion, the wavelength A will directly influence the result of the phase distribution regardless of either of the two methods. When the wavelength of each incident beam of light is different, it is necessary to calculate the phase distribution according to the working wavelength of different metalens portions. Since the analytical formula of the deflection phase and the shaping phase both include the wavelength $\lambda$, the phase of each metalens portion will change simultaneously with the deflection distance $x_0$ and the wavelength $\lambda$.

When the wavelengths of the incident beams are different, except for the phase distribution of each metalens portion and wavelength will be directly related, the arrangement of unit cells may be selected according to the optical phase at different wavelengths. For example, for the silicon nitride nano pillar in the metalens portion used for the visible light band, nano pillars of the same size have large changes in phase for visible light at different wavelengths. When arranging nanostructures in metalens portions, the relationship of different metalens portions and the phase is different, so the size of the same phase on different metalens portions may be different.

When arranging the nano pillars with different wavelengths and different units, if the span of the wavelength is larger, like the visible light and the infrared band, the difference between the half-wavelengths may be larger, so the periodicity of nanostructures can be quite different in arrangement. In addition, different materials of the nanostructure are with suitable optical response in different bands, so different materials of the nanostructure can be selected and arranged in unit.

As shown in FIG. 3, the present embodiment includes a metalens, the metalens is designed by the design method as described above, the metalens includes a plurality of metalens portions corresponding to the incident Gaussian beams, when the Gaussian beams pass through the metalens, the Gaussian beams are shaped into flat-topped beams and the flat-topped beams projects to the target position on the target plane.

Partial of the metalens portions are configured to deflect and output the flat-topped beam 3 if the metalens portion is coaxial with the incident Gaussian beam 2, so the flat-topped beams form one beam at the same spatial position, which means the target position 41 in the present embodiment.

As shown in FIG. 4, the plurality of metalens portions include shaping-deflection metalens portions, and the phase distribution of the shaping-deflection metalens portion is a combination of the phase distribution of the flat-topped beam on deflection position in x-axis $\varphi_{1x}(x)$ and the phase distribution of the flat-topped beam on deflection position in y-axis $\varphi_{1y}(y)$.

In one embodiment, the plurality of metalens portions include shaping-deflection metalens portions and shaping metalens portions; the shaping-deflection metalens portion is configured with the shaping phase distribution $\varphi_1(x, y)$, and is used to modulate the Gaussian beams into flat-topped beams; the shaping-deflection metalens portions is configured with the deflection phase distribution $\varphi_2(x, y)$, and is used to deflect the flat-topped beams to the target position.

The phase distribution of the shaping-deflection metalens portion 12 satisfies: $\varphi(x, y)=\varphi_{1x}(x)+\varphi_{1y}(y)$. The shaping metalens portion 11 satisfies: $\varphi(x, y)=\varphi_1(x, y)$. The phase distribution of the shaping-deflection metalens portion 12 satisfies: $\varphi(x, y)=\varphi_1(x, y)+\varphi_2(x, y)$.

The phase distributions $\varphi_{1x}(x)$, $\varphi_{1y}(y)$, $\varphi_1(x, y)$ and $\varphi_2(x, y)$ in this embodiment are the same as the corresponding phase distributions in the aforementioned design method and will not be described here.

Optionally, the working wavelengths of metalens portions are different for receiving Gaussian beams with different wavelengths. Specifically, the metalens portions may include nanostructures with the phases covering from 0 to $2\pi$ in working wavelength.

Optionally, the working wavelengths of multiple metalens portions are the same, the phase distribution of the metalens portions is correlated to the working wavelength.

The metalens based on the multiple wavelengths is especially suitable for the RGB display device and other devices that involve mixing light with different color beams. The application scenarios of the above metalens with the same working wavelength can be power laser, illumination, etc. In a typical embodiment, a metalens has metalens portions, such as including red, green or blue light in a metalens portion. And the projection target position of each metalens portion is different, and the projection target position of each metalens portion can be used as each pixel position for display.

In addition, in the same metalens 100, a metalens portion may be mixed set with metalens portions at different working wavelengths or the same working wavelength.

In addition, the present disclosure may include the situation that the incident Gaussian beam radius in the direction of x-axis, y-axis are the same, and the width of the outgoing flat-topped beam in the direction of x-axis, y-axis are different. Or the situation that the incident Gaussian beam radius in the direction of x-axis, y-axis are the different, and the width of the outgoing flat-topped beam in the direction of x-axis, y-axis are the same.

In a typical embodiment, as can be seen from FIG. 3, only the metalens portions that are coaxial at the target position are the shaping metalens portions 11 without the function of deflection, and other portions of metalens portions are shaping-deflection metalens portions 12.

In a typical embodiment, all the metalens portions are shaping-deflection metalens portions 12.

In one embodiment, the metalens portions are set on different positions of one surface of the substrate.

In one embodiment, the metalens portions 1 may be set on the different substrates and further splicing to form a metalens 100.

In one embodiment, the plurality of metalens portions 1 are capable of focusing and expanding. And the embodiment of expansion as shown in FIG. 7.

In a typical embodiment, a metalens 100 includes the plurality of metalens portions, each metalens portion is used to form a pixel. As shown in FIG. 7, the metalens unit includes three metalens portions and the metalens portions are used to expand the beams. The working wavelength of each metalens portion is used for modulating red, green and blue light, respectively. One of the functions of beam expansion is to spread the pixels all over the target plane.

The present disclosure provides a shaping and beam-combination device that is different from the shaping and beam-combination device in prior art. The shaping and beam-combination device may be applied to laser processing or laser illumination. And the shaping and beam-combination device has a smaller optical length and size, could significantly solve the problems that the uneven light intensity distribution of the end face of the beam-combination in the prior art.

The shaping and beam-combination device includes the metalens 100 and the inputting end as described in the aforementioned embodiment, and the inputting end is set on the downstream of the optical path of the metalens and is used to input the plurality of Gaussian beams, the plurality of metalens portions align with one of the Gaussian beams emitted by the inputting end, respectively.

The present disclosure provides a display device, and its optical schematic diagram is shown in FIG. 7. The device includes the metalens and the inputting end and an outputting end as described in the aforementioned embodiment. The inputting end is used to input the plurality of monochromatic Gaussian beams of different colors, the metalens is used for mixing the plurality of monochromatic Gaussian beams of different colors and forming a pre-set color flat-topped beam to output from the outputting end, and the plurality of metalens portions in metalens are used to perform the beam expansion for flat-topped beams.

In addition, the present disclosure provides a design device which is used to input the condition parameters and output the production parameters of the metalens 100. The design includes a first determining module, a second determining module, and a generation module. Optionally, the design device may further include an optimization module.

The first determining module is used for determining an incident parameter, and the incident parameter includes a plurality of wavelengths and radius of the plurality of Gaussian beams.

The second determining module is used for determining an outgoing parameter, and the outgoing parameter includes the width of the plurality of flat-topped beams.

The generation module may further include:
a wavelength judgment unit, which is used for determining whether the wavelength of the incident Gaussian beams is the same;
a division unit, which is used for dividing the metalens 100 into metalens portions according to the incident Gaussian beams;
and a phase calculation unit, which is used for calculating the modulation phase based on the phase distribution of each metalens portion when the wavelengths of the incident Gaussian beams are the same, so as to obtain the phase distribution of each metalens portion; and the phase calculation unit, which is used for calculating the modulation phase based on the phase distribution of each metalens portion when the wavelengths of the incident Gaussian beams are the same, so as to obtain the phase distribution of each metalens portion.

The optimization module is used for iterative optimization of the phase distribution.

The present disclosure provides a computer program application, and the application includes a computer program, and the computer program is stored in the computer program application. And the computer program is executed to implement the design method for the metalens 100 as described in the aforementioned embodiment.

The present disclosure provides a computer-readable storage medium on which the above-mentioned computer program is stored.

The present disclosure further provides several specific embodiments to further explain the technical scheme of the present disclosure.

Embodiment 1: A Shaping and Beam-Combination
Metalens for Single-Wavelength

Figure 8:
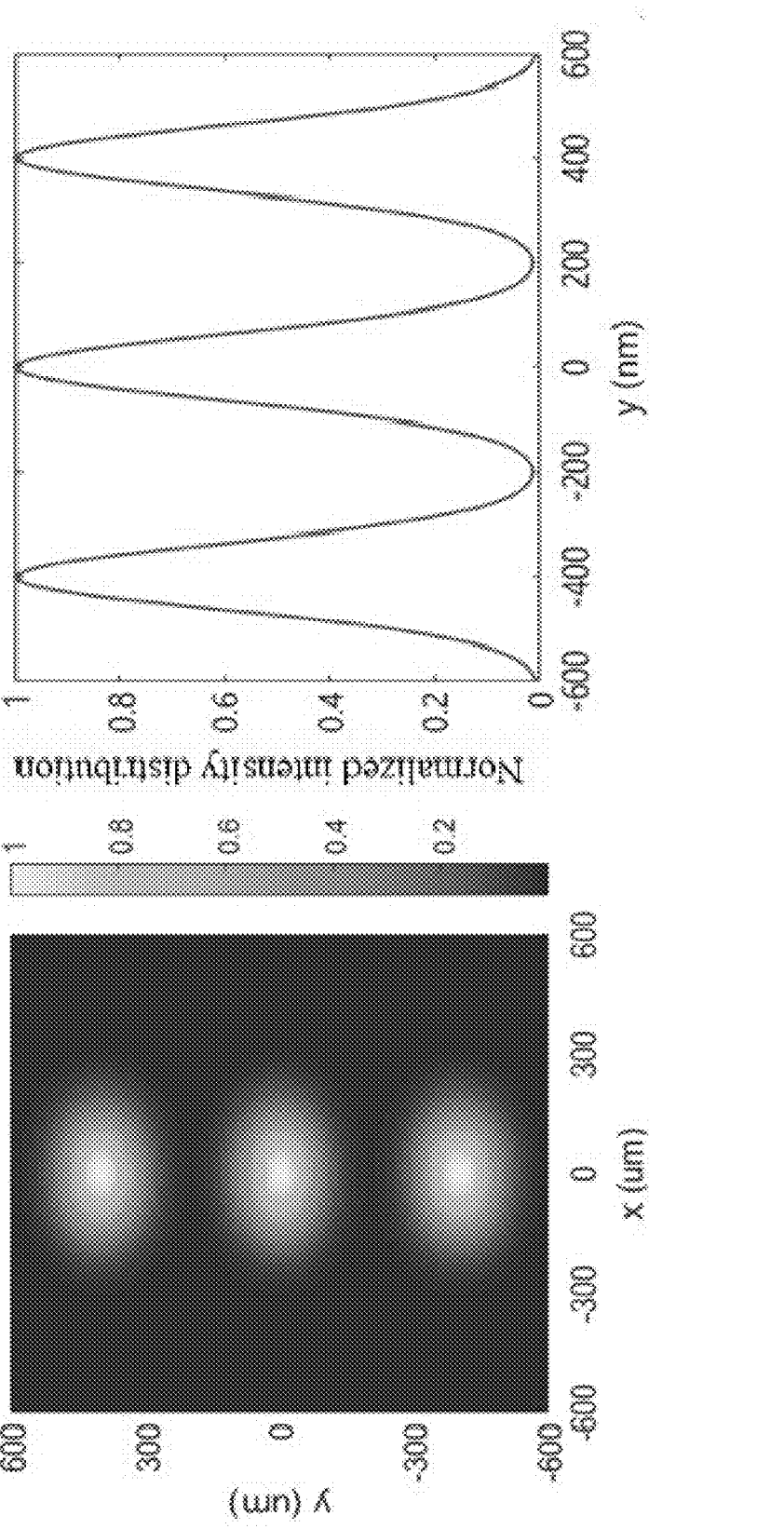
FIG. 8 is the light intensity distribution of the incident light beam in the embodiment.
Figure 9:
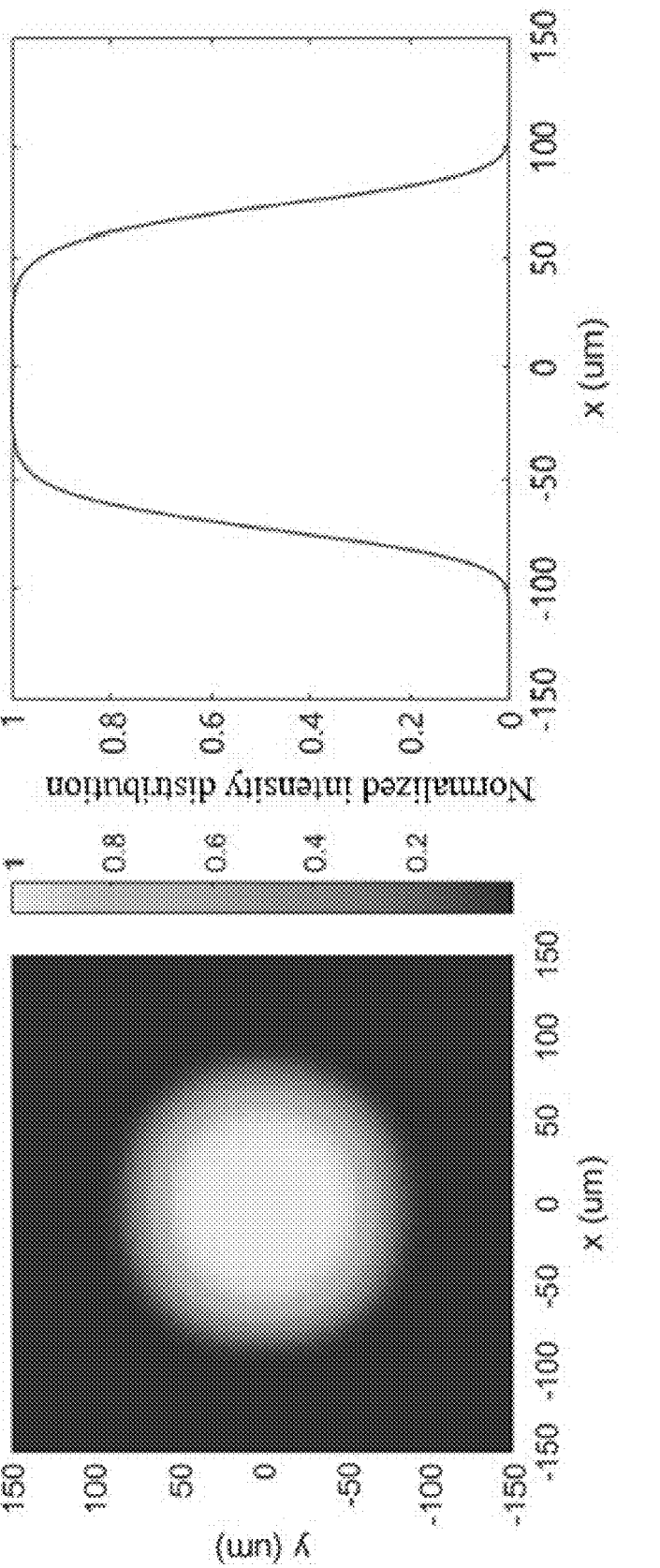
FIG. 9 is a schematic diagram of light intensity distribution after single wavelength beam shaping and beam application in the embodiment.
Figure 10:
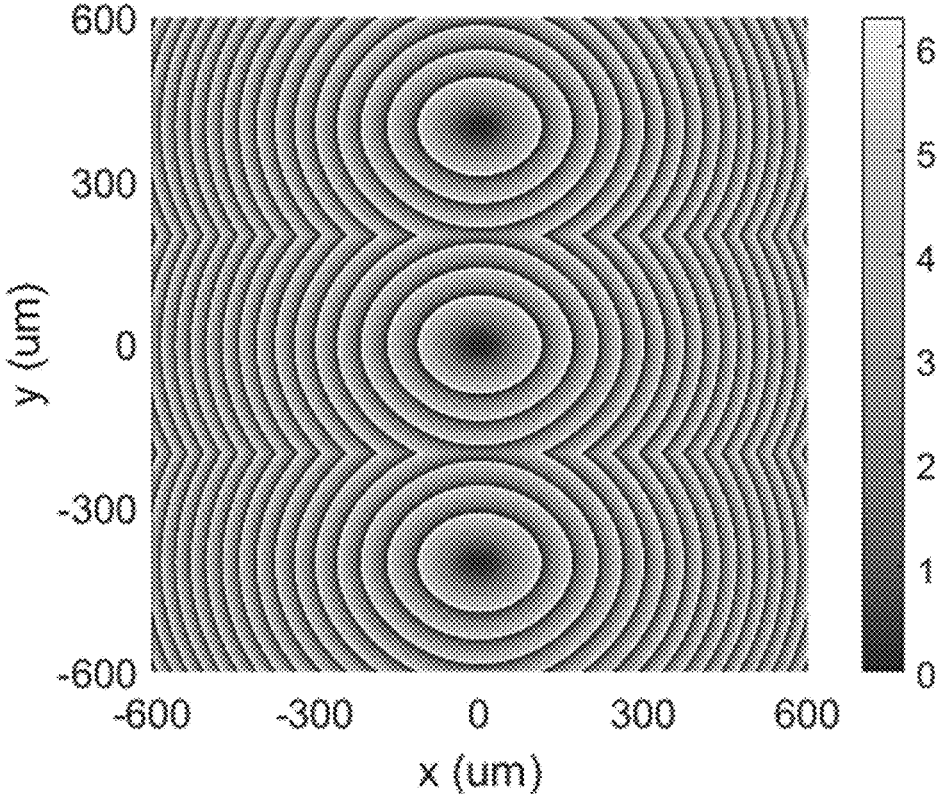
FIG. 10 is a phase distribution diagram of the metalens provided in one embodiment.

For three Gaussian beams with a transverse radius of 212 µm and longitudinal radius of 127 µm in the plane where the metasurface is located, the longitudinal interval of each beam is 400 µm and the wavelength is 940 nm. The light intensity distribution of each incident beam is shown in FIG. 8. The normalized intensity distribution at x=0 is shown on the right of FIG. 8. A single-wavelength incident beam can be shaped and combined into a flat-topped beam with a radius of 95 mm in a plane by using a metalens of 1.22 mm. And the distance between the metalens and the plane is 4.8 mm. The light intensity distribution of the flat-topped beam is shown in FIG. 9. The normalized intensity distribution at y=0 is shown on the right of FIG. 9, and the phase distribution of the above metalens is shown in FIG. 10.

Figure 11:
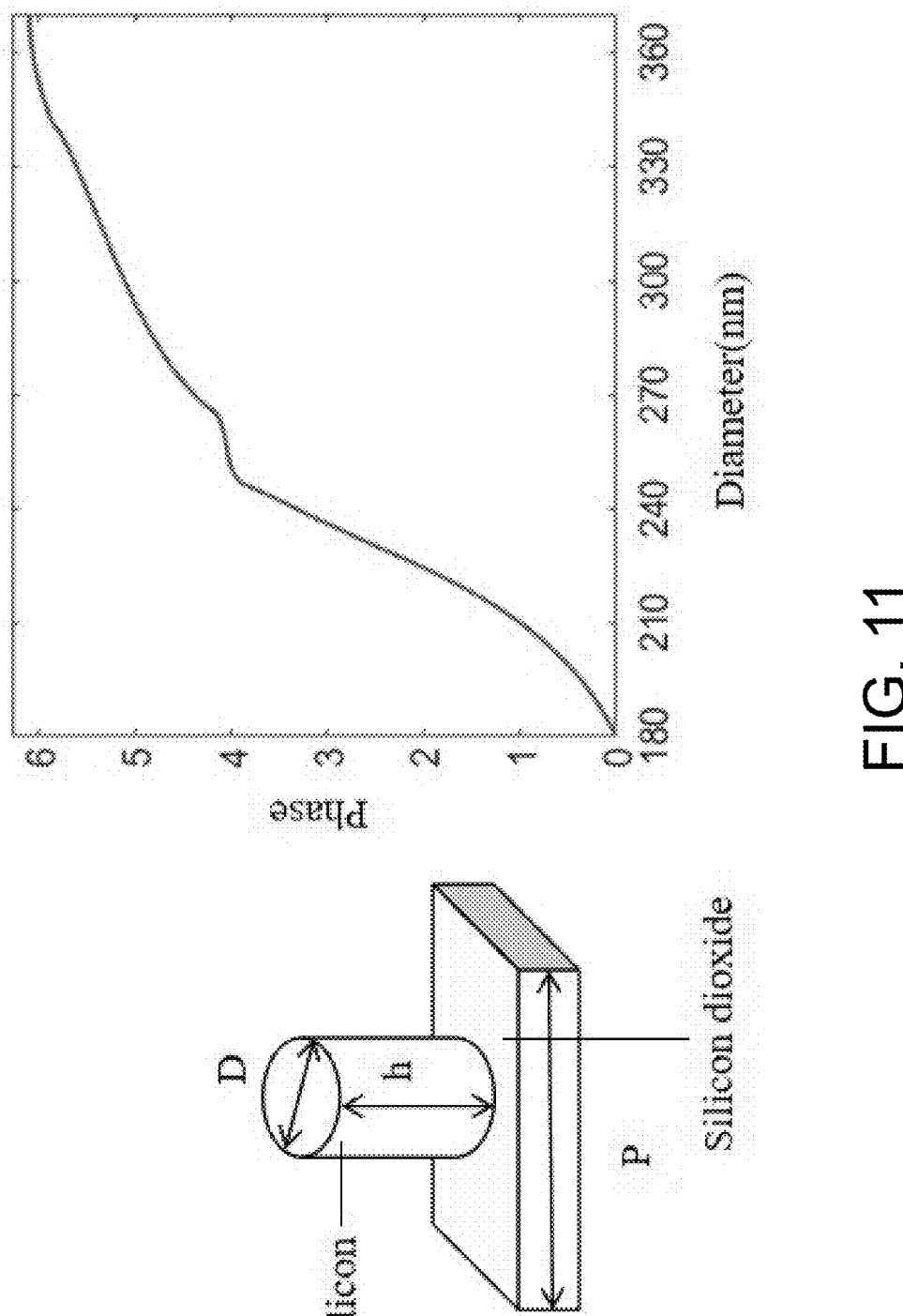
FIG. 11 is a schematic diagram of the silicon nanopillar structural unit and the diameter and regulatory phase relationship.

In the database, the nanostructure is the silicon nano pillar and with silica as a substrate, and has a height of 600 nm, a period of 550 nm. The refractive index of silica and silica is 1.45 and 3.42, respectively. The relationship between the simulated diameter D and the modulation phase of the nanostructure at the wavelength of 940 nm is shown in FIG. 11. And the nanostructure has the modulation phase covering 0 to 2π with the radius from 180 to 360 nm, which has an efficient phase modulation ability and can be applied to the above phase modulation.

Figure 12:
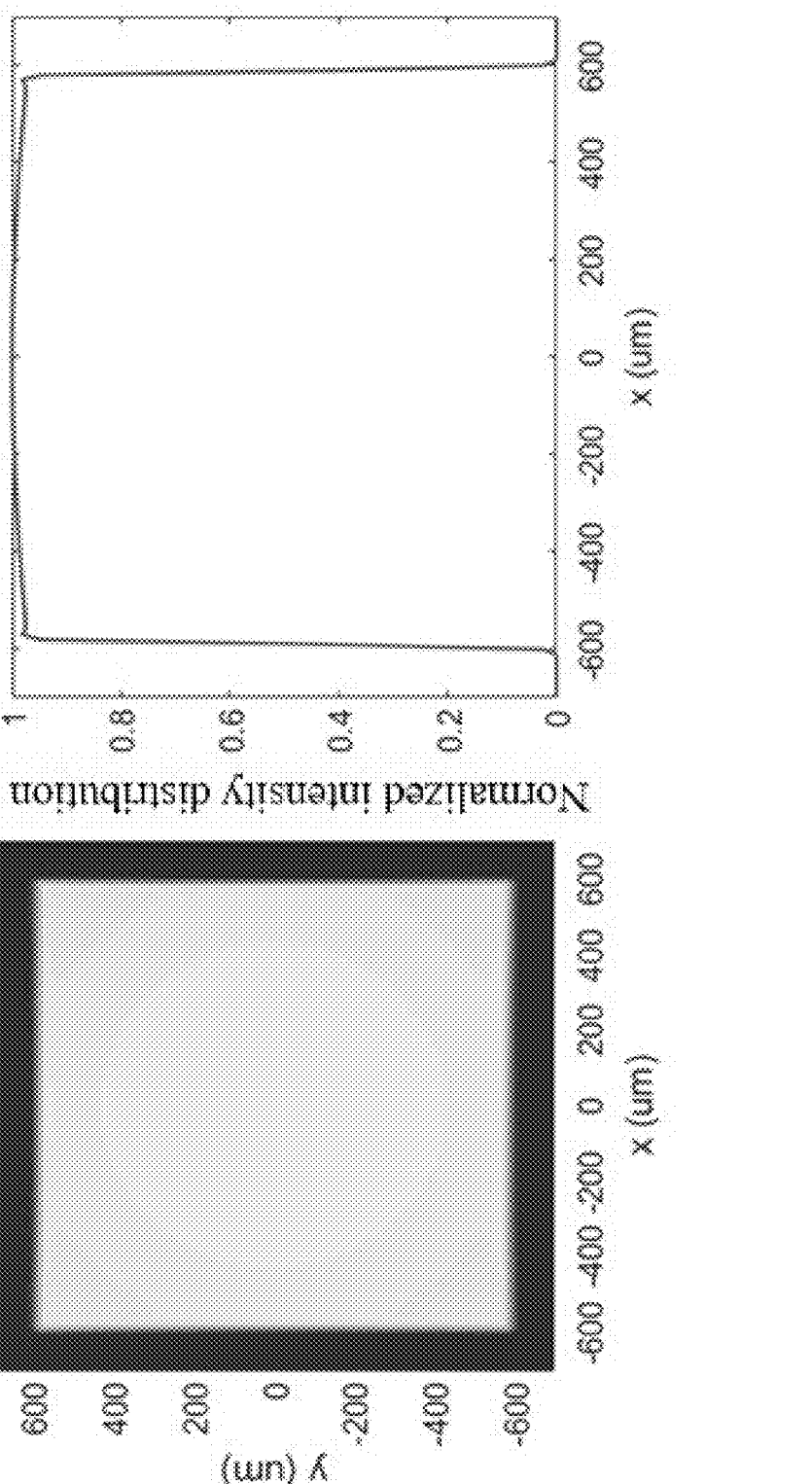
FIG. 12 is a schematic diagram of the light intensity distribution after multi-wavelength beam shaping and closing as described in the embodiment.
Figure 13:
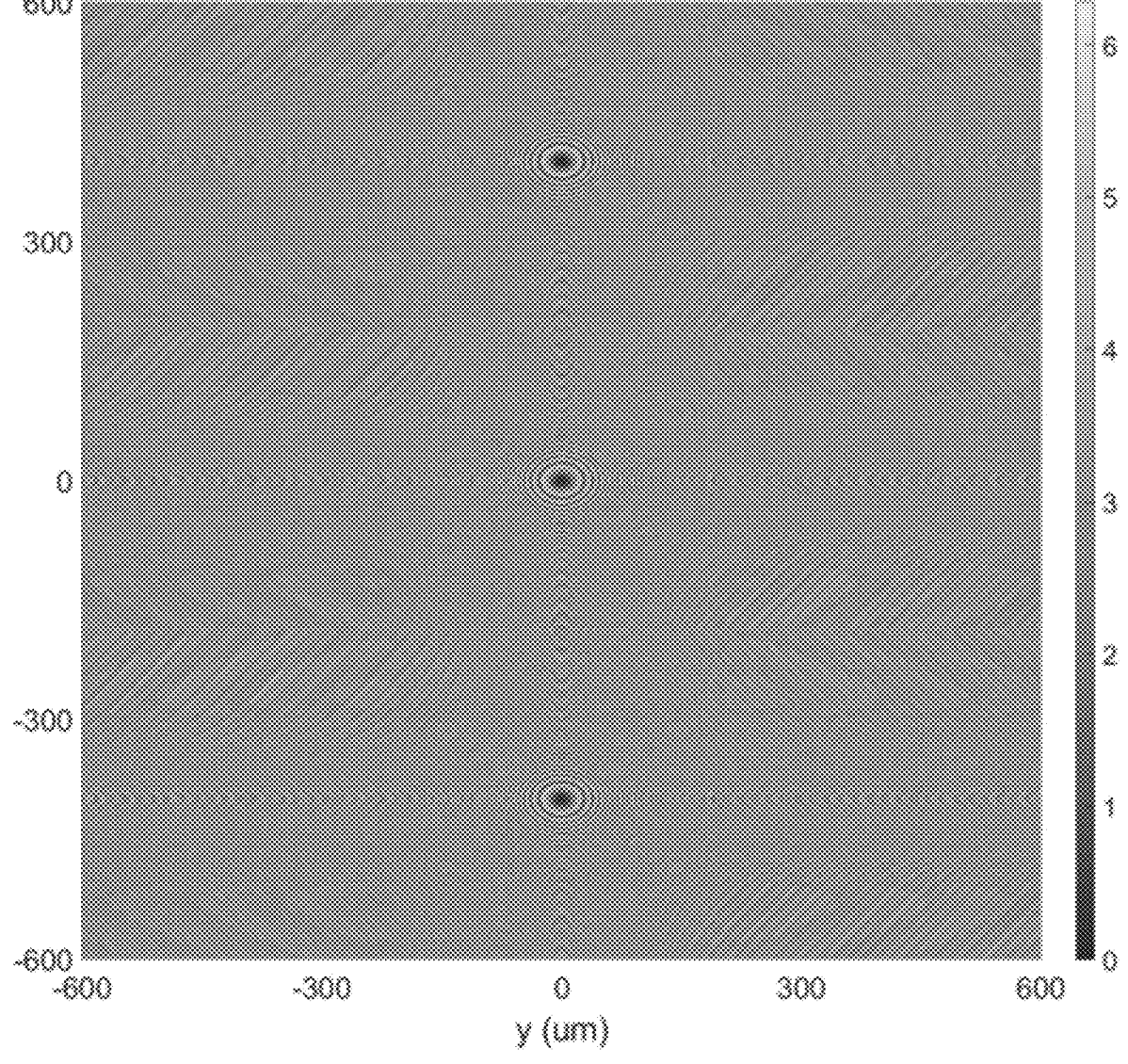
FIG. 13 is a phase distribution diagram of a metalens for modulating the multi-wavelengths according to the embodiment of the present disclosure.
Figure 14:
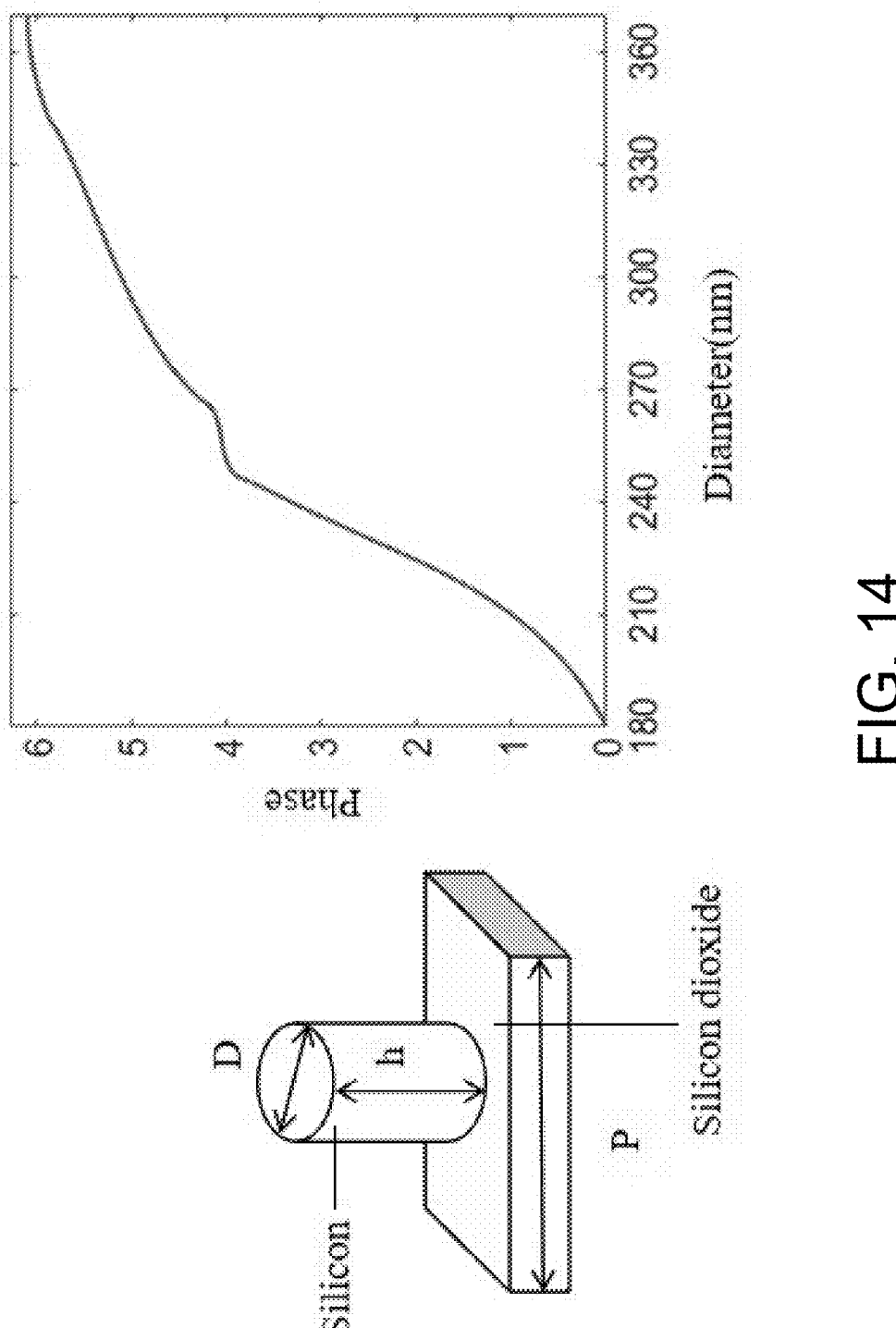
FIG. 14 is a relationship schematic diagram of the silicon nitride nano pillar in unit cell between the diameter and the phase modulation according to the embodiment of the present disclosure.

Embodiment 2: A Metalens for Shaping and
Beam-Combination of RGB Three Wavelengths For three beams of Gaussian light with a transverse radius of 212 µm and a vertical radius of 127 µm in the plane where the metasurface is located, the longitudinal interval of each beam is 400 µm, and has the same light intensity distribution as shown in FIG. 8. However, the wavelengths are 440 nm (blue), 550 nm (green) and 660 nm (red), respectively. At this time, the phase distribution and the arrangement of metalens portions are designed according to the above different wavelengths. A metalens of 1.2 mm is used for shaping and combining the RGB beams into a square flat-topped beam with a width of 600 mm in a plane. And the distance between the metalens and the plane is 4.8 mm. FIG. 12 shows the light intensity distribution after shaping and combining the multi-wavelength beam, and the normalized intensity distribution at y=0 is on the right of FIG. 12. The phase distribution of the above metalens is shown in FIG. 13.

For visible light, this embodiment takes the wavelengths of 440 nm, 550 nm and 660 nm as examples, and the refractive index of silicon nitride is 2.0538, 2.0232 and 2.0074, respectively. The silica substrate has a refractive index of 1.45. When using the nanopillar structure with height (H) of 1.2 µm and period (P) of 420 nm, the relationship between diameter (D) and the modulation phase obtained by simulation is shown in FIG. 12. The modulation phase of each wavelength in the diameter range of 150 to 300 nm basically covers 0~2π, which can be applied to phase modulation for the beams of the above three wavelengths.

In summary, the above technical schemes in the present disclosure design a metalens by the design of the metalens portions (optionally portion design of wavelengths) to form a metalens array composed of a plurality of metalens, which can modulate simultaneously multiple wavelengths. And it also can extend to the modulation of multi-wavelength beam. When the plurality of beams passes through the metalens, the metalens can complete both shaping and beam combination simultaneously to form the light spots with larger energy and uniform or good color rendering index. And the metalens is a two-dimensional planar lens for light modulation by using the sub-wavelength metalens portion. The metalens has a small volume and light weight, which solves the problem of the larger volume of the conventional lens group. In addition, the metasurface is processed by the semiconductor industry, so the materials of the metalens are mainly heat-resistant materials such as silicon, and the phase modulation variation of the metalens with the temperature changing is very small. And the metalens can keep a better performance when facing beams with higher power, and can withstand the larger power of the incident beams.

It should be noted that the metalens 100 provided by the present disclosure can be processed through a semiconductor process, and the metalens 100 has the advantages of light weight, thin thickness, simple structure, simple fabrication, low cost and high consistency in mass production.

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. A design method for a metalens, when a plurality of Gaussian beams passes through the metalens, the Gaussian beams are shaped into a plurality of flat-topped beams that project to a target position on a target plane, the design method comprising:

determining an incident parameter, wherein the incident parameter comprises a plurality of wavelengths and a plurality of radius of the plurality of Gaussian beams;

determining an outgoing parameter, wherein the outgoing parameter comprises a width of the plurality of flat-topped beams;

setting a plurality of metalens portions on the metalens and determining a position of each metalens portion; wherein the plurality of metalens portions and the plurality of Gaussian beams are in one-to-one correspondence, calculating a modulation phase distribution of each metalens portion according to the incident parameter, the outgoing parameter and the position of each portion metalens;

arranging a plurality of unit cells on the metalens portions according to the modulation phase distribution, and obtaining the metalens.

2. The design method for a metalens according to claim 1, wherein determining the incident parameter comprises:

determining whether the plurality of wavelengths of the plurality of Gaussian beams are the same.

3. The design method for a metalens according to claim 2, wherein when the wavelengths of the Gaussian beams are the same, calculating the modulation phase distribution of each metalens portion comprises:

determining a deflection distance between each metalens portion and the corresponding target position; and calculating the modulation phase distribution according to the deflection distance.

4. The design method for a metalens according to claim 2, wherein when the wavelengths of the Gaussian beams are different, calculating the modulation phase distribution comprises:

determining a deflection distance between each metalens portion and the corresponding target position;

calculating the modulation phase distribution according to the deflection distance; and selecting a size of the unit cell of corresponding metalens portion according to the wavelength of the Gaussian beams.

5. The design method for a metalens according to claim 4, wherein when the wavelengths of the Gaussian beams are different, calculating the modulation phase distribution further comprises:

selecting a material of the unit cells of the corresponding metalens portions according to the wavelength of the Gaussian beams.

6. The design method for a metalens according to claim 3, wherein the modulation phase distribution $\varphi(x, y)$ of each metalens portion satisfies:

$$\varphi(x, y) = \varphi_{1x}(x) + \varphi_{1y}(y);$$

$$\varphi_{1x}(x) =$$

$$\frac{2\pi}{\lambda * z}\left\{\frac{\omega_{1x}\omega_{2x}}{\sqrt{2\pi}}\left[\exp\left(-\frac{2(x-x_0)^2}{\omega_{1x}^2}\right) + (x-x_0)\int_0^{x-x_0}\exp\left(-\frac{2t^2}{\omega_{1x}^2}\right)dt - 1\right] - \frac{1}{2}(x-x_0)^2\right\};$$

$$\varphi_{1y}(y) = \frac{2\pi}{\lambda * z}\left\{\frac{\omega_{1y}\omega_{2y}}{\sqrt{2\pi}}\left[\exp\left(-\frac{2(y-y_0)^2}{\omega_{1y}^2}\right) + (y-y_0)\int_0^{y-y_0}\exp\left(-\frac{2t^2}{\omega_{1y}^2}\right)dt - 1\right] - \frac{1}{2}(y-y_0)^2\right\};$$

wherein, $\varphi_{1x}(x)$ is a phase distribution of the flat-topped beams on the deflection position in an x-axis; $\varphi_{1y}(y)$ is a phase distribution of the flat-topped beams on the deflection position in a y-axis; $\omega_{1x}$ is the radius of the Gaussian beams in the x-axis; $\omega_{1y}$ is the radius of the Gaussian beams in the y-axis; $\omega_{2y}$ is half a width of the Gaussian beams in the y-axis; x, y are plane coordinates of a shaping metalens portion; t is an integration variable; $x_0$ is the deflection distance in the x-axis; $y_0$ is the deflection distance in the y-axis; z is a distance between a plane where the metalens is located and the target plane; $\lambda$ is a working wavelength.

7. The design method for a metalens according to claim 4, wherein the modulation phase distribution $\varphi(x, y)$ of the metalens portion satisfies:

$$\varphi(x, y) = \varphi_{1x}(x) + \varphi_{1y}(y);$$

$$\varphi_{1x}(x) =$$

$$\frac{2\pi}{\lambda * z}\left\{\frac{\omega_{1x}\omega_{2x}}{\sqrt{2\pi}}\left[\exp\left(-\frac{2(x-x_0)^2}{\omega_{1x}^2}\right) + (x-x_0)\int_0^{x-x_0}\exp\left(-\frac{2t^2}{\omega_{1x}^2}\right)dt - 1\right] - \frac{1}{2}(x-x_0)^2\right\};$$

$$\varphi_{1y}(y) = \frac{2\pi}{\lambda * z}\left\{\frac{\omega_{1y}\omega_{2y}}{\sqrt{2\pi}}\left[\exp\left(-\frac{2(y-y_0)^2}{\omega_{1y}^2}\right) + (y-y_0)\int_0^{y-y_0}\exp\left(-\frac{2t^2}{\omega_{1y}^2}\right)dt - 1\right] - \frac{1}{2}(y-y_0)^2\right\};$$

wherein, $\varphi_{1x}(x)$ is a phase distribution of the flat-topped beams on the deflection position in an x-axis; $\varphi_{1y}(y)$ is a phase distribution of the flat-topped beams on the deflection position in a y-axis; $\omega_{1x}$ is the radius of the Gaussian beams in the x-axis; $\omega_{1y}$ is the radius of the Gaussian beam in the y-axis; $\omega_{2y}$ is the half radius of the Gaussian beam in the y-axis; x, y are the plane coordinates of a shaping metalens portion; t is an integration variable; x0 is the deflection distance in the x-axis; y0 is the deflection distance in the y-axis; z is a distance between a plane where the metalens is located and the target plane; $\lambda$ is a working wavelength.

8. The design method for a metalens according to claim 3, wherein calculating the modulation phase distribution of each metalens portion comprises:

calculating a shaping phase distribution $\varphi_1(x, y)$, and the shaping phase distribution is used to shape the Gaussian beams with the coaxial direction of each portion metalens into the flat-topped beams;

calculating a deflection phase distribution $\varphi_2(x, y)$ according to the deflection distance;

obtaining the modulation phase distribution $\varphi(x, y)$ according to the shaping phase distribution and the deflection phase distribution $\varphi_2(x, y)$, and the modulation phase distribution $\varphi(x, y)$ satisfies: $\varphi(x, y)=\varphi_1(x, y)+\varphi_2(x, y)$.

9. The design method for a metalens according to claim 4, wherein calculating the modulation phase distribution of each metalens portion comprises:

calculating a shaping phase distribution $\varphi_1(x, y)$ of each metalens portion in a coaxial direction, wherein shaping modulation is configured to shape the Gaussian beams into the flat-topped beams;

calculating a deflection phase distribution $\varphi_2(x, y)$ according to the deflection distance;

obtaining the modulation phase distribution $\varphi(x, y)$ according to the shaping phase distribution and the deflection phase distribution $\varphi_2(x, y)$, and the modulation phase distribution $\varphi(x, y)$ satisfies: $\varphi(x, y)=\varphi_1(x, y)+\varphi_2(x, y)$.

10. The design method for a metalens according to claim 9, wherein the shaping phase distribution $\varphi_1(x, y)$ satisfies:

$$\varphi_1(x, y) = \varphi_{1x}(x) + \varphi_{1y}(y);$$

$$\varphi_{1x}(x) = \frac{2\pi}{\lambda}\left\{\frac{\omega_{1x}\omega_{2x}}{\sqrt{2\pi}}\left[\exp\left(-\frac{2x^2}{\omega_{1x}^2}\right) + x\int_0^x\exp\left(-\frac{2t^2}{\omega_{1x}^2}\right)dt - 1\right] - \frac{1}{2}x^2\right\};$$

$$\varphi_{1y}(y) = \frac{2\pi}{\lambda}\left\{\frac{\omega_{1y}\omega_{2y}}{\sqrt{2\pi}}\left[\exp\left(-\frac{2y^2}{\omega_{1y}^2}\right) + y\int_0^y\exp\left(-\frac{2t^2}{\omega_{1y}^2}\right)dt - 1\right] - \frac{1}{2}y^2\right\};$$

wherein, the $\varphi_{1x}(x)$ is the shaping phase distribution in an x-axis, $\varphi_{1y}(y)$ is the shaping phase distribution in a y-axis; $\omega_{1x}$ is the radius of the Gaussian beams in the x-axis; $\omega_{1y}$ is the radius of the Gaussian beams in the y-axis; $\omega_{2y}$ is half a width of the flat-topped beams in the y-axis; x, y are plane coordinates of a shaping metalens portion; t is an integration variable.

11. The design method for a metalens according to claim 9, wherein the deflection phase distribution $\varphi_2(x, y)$ satisfies:

$$\varphi_2(x, y) = \varphi_2(x) + \varphi_2(y);$$

$$\varphi_2(x) = \frac{2\pi}{\lambda} \frac{x_0}{\sqrt{x_0^2 + z^2}} x + \varphi_0;$$

$$\varphi_2(y) = \frac{2\pi}{\lambda} \frac{y_0}{\sqrt{y_0^2 + z^2}} y + \varphi_0;$$

wherein, the $\varphi_2(x)$ is a deflection phase to an x-axis; $\varphi_2(y)$ is a deflection phase to a y-axis; $\varphi_0$ is a constant of integration; $x_0$ is the deflection distance in the x-axis; $y_0$ is the deflection distance in the y-axis; z is a distance between a plane where the metalens is located and the target plane; $\lambda$ is a working wavelength.

12. The design method for a metalens according to claim 3, wherein calculating the modulation phase distribution comprises:

calculating an optical field modulation phase, wherein the optical field modulation phase is configured to modulate Gaussian optical field on an inputting end into a flat-topped optical field of the target position;

the optical field modulation phase comprises a first direction optical field modulation phase and a second direction optical field modulation phase, and the first direction and the second direction are perpendicular to each other.

13. The design method for a metalens according to claim 4, wherein calculating the modulation phase distribution comprises:

calculating an optical field modulation phase, wherein the optical field modulation phase is configured to modulate Gaussian optical field on an inputting end into a flat-topped optical field of the target position;

the optical field modulation phase comprises a first-direction optical field modulation phase and a second-direction optical field modulation phase, and the first-direction and the second direction are perpendicular to each other.

14. A metalens, designed by the design method as claimed in claim 1, the metalens comprising a plurality of metalens portions corresponding to the incident Gaussian beams, when the Gaussian beams pass through the metalens, the Gaussian beams are shaped into the flat-topped beams, and the flat-topped beams project to the target position on the target plane.

15. The metalens according to claim 14, wherein the plurality of metalens portions comprise a shaping-deflection metalens portion, and a phase distribution of the shaping-deflection metalens portion is a combination of a phase distribution of the flat-topped beams on a deflection position in x-axis $\varphi_{1x}(x)$ and a phase distribution of the flat-topped beams on a deflection position in y-axis $\varphi_{1y}(y)$.

16. The metalens according to claim 14, wherein the plurality of metalens portions comprise a plurality of shaping-deflection metalens portions and a plurality of shaping metalens portions;

the shaping metalens portion is configured with a shaping phase distribution $\varphi_1(x, y)$, and is configured to modulate the Gaussian beams into the flat-topped beams;

the shaping-deflection metalens portions has a deflection phase distribution $\varphi_2(x, y)$, and is configured to defect the flat-topped beams to the target position.

17. The metalens according to claim 16, wherein shaping metalens portions are coaxial with the target position, and other portions of metalens portions are the shaping-deflection metalens portions.

18. A modulation and beam-combination device, comprising the metalens according to claim 14 and an inputting end, wherein the inputting end is arranged upstream of an optical path of the metalens and is configured to input the plurality of Gaussian beams, the plurality of metalens portions align with one of the Gaussian beams emitted by the inputting end, respectively.

19. A display device, comprising the metalens of claim 14, an inputting end and an outputting end;

wherein the inputting end is configured to inputting a plurality of monochromatic Gaussian beams of different colors, the metalens is configured for mixing the plurality of monochromatic Gaussian beams of different colors and forming a pre-set color flat-topped beam, and then outputting the pre-set color flat-topped beam from the outputting end;

the plurality of metalens portions of the metalens are configured to perform beam expansion for the flat-topped beams.

20. A computer program application, comprising a computer program, and the computer program is stored in the computer program application;

and the computer program is executed to implement the design method of claim 1.

\* \* \* \* \*